United States Patent [19]
Enarson et al.

[11] Patent Number: 5,964,248
[45] Date of Patent: Oct. 12, 1999

[54] ARRANGEMENT IN REGULATING VALVES

[75] Inventors: Knut Enarson; Sven-Åke Jacobsson, both of Säffle, Sweden

[73] Assignee: BTG Kalle Inventing AB, Säffle, Sweden

[21] Appl. No.: 08/796,296

[22] Filed: Feb. 7, 1997

Related U.S. Application Data

[63] Continuation of application No. 08/423,536, Apr. 17, 1995, abandoned.

[30] Foreign Application Priority Data

Apr. 15, 1994 [SE] Sweden .................................. 9401306

[51] Int. Cl.$^6$ ...................................................... F16K 1/52
[52] U.S. Cl. ................................. 137/625.39; 137/625.37
[58] Field of Search ........................... 137/625.39, 625.3, 137/625.37, 625.38

[56] References Cited

U.S. PATENT DOCUMENTS

| | | | |
|---|---|---|---|
| 3,908,698 | 9/1975 | Baumann | 137/625.3 |
| 3,990,475 | 11/1976 | Myers | 137/625.3 |
| 4,662,603 | 5/1987 | Etheridge | 137/625.3 X |
| 5,012,841 | 5/1991 | Kueffer | 137/625.39 |
| 5,113,908 | 5/1992 | Steinke | 137/625.3 |
| 5,351,717 | 10/1994 | Saito | 137/625.3 X |

*Primary Examiner*—John Fox
*Attorney, Agent, or Firm*—Ostrolenk, Faber, Gerb & Soffen, LLP

[57] ABSTRACT

The invention relates to an arrangement in regulating valves for steam, gases or liquids and includes a cage (2) fixedly disposed in a valve housing (1), there being a movable valve body in the cage, the body (3) being positionally settable in the fixed cage (2) via a spindle (4) such as to be sealingly engageable via a sealing surface (5) formed on it against a seating (6) formed in the valve housing (1), the body (3) during its movement to its upper, i.e. fully open, position successively uncovering orifices (9) in the fixed cage (2) for achieving a gradual increase in through-flow area in the valve. The body (3) has a short skirt (10) coacting with seating (6) and provided with a plurality of orifices or grooves (11) which are successively uncovered at the beginning of the valve opening phase, as the body (3) moves away from its sealing engagement against the seating (6), or successively closed off during the valve closing phase as the body moves towards sealing engagement against the seating (6) such as to serve as an extra throttling locating for small opening increments for achieving great regulation accuracy even with small flows.

11 Claims, 4 Drawing Sheets

ARRANGEMENT IN REGULATING VALVES

This is a continuation of application Ser. No. 08/423,536, filed on Apr. 17, 1995, now abandoned.

BACKGROUND OF THE INVENTION

1. Field of the Invention

The present invention relates to an arrangement in regulating valves for steam, gases or liquids, and includes a cage fixedly disposed in a valve housing. A movable valve body is disposed in the cage for connection, via a spindle, to a setting means having a position regulator for positional setting of the valve body in the cage. The body is provided at its lower portion with a sealing surface for enabling sealing engagement against a seating on the valve housing. The body in its movement to its upper, or completely open, position successively uncovers orifices in the fixed cage so as to achieve a gradual increase in the through-flow area of the valve.

2. Description of the Related Art

Regulating valves on the market at present have a fixed cage and a movable valve body, which is abruptly cut off below the sealing surface, thus providing a valve characteristic of the type signifying quick opening for small opening increments. The cause of this is that leakage via the gap between fixed cage and movable body is considerable, with consequential difficulty in accurately regulating small flows. For purely technical reasons, it is not possible to have small clearances between the fixed cage and valve body. The cage is namely subjected to pressure on its outside, particularly when the medium to be regulated is superheated steam, which may have a temperature of 540° C., for example. Since the cage will then be caused to contract, the clearance between cage and valve body must be relatively large to avoid sticking or seizure of the body in the cage during the operational life for which the valve has been designed.

SUMMARY OF THE INVENTION

The object of the present invention is to provide a valve of the kind mentioned in the introduction, where the problems therewith have been eliminated. The distinguishing features of the invention are disclosed in the accompanying claims.

Due to the present invention there has now been achieved an arrangement in regulating valves, which excellently fulfills its purpose, while also being inexpensive and relatively simple to manufacture. With the inventive regulating valve, improved regulation for small opening increments is afforded, in combination with large flow capacity when it is fully open. There is thus achieved a large range of regulation, without giving up regulating accuracy for small flows. By having, in accordance with the invention, on the movable valve body a short cage or skirt with throttling orifices, an extra throttling location for small opening increments is obtained. In addition, the small short skirt on the valve body can be given very little clearance between cage and seating, and thus gap leakage will be small. The seating is thermally flexibly fastened to the valve housing, which is an advantage, since for transitory conditions the seating will be heated more rapidly than the housing, and the seating can then expand even though the housing warms up more slowly than it does. The short skirt on the body is heated at the same rate as the seating in such a case, thus enabling clearance to be kept small.

BRIEF DESCRIPTION OF THE DRAWING

The invention is described more in detail below, with the aid of a preferred embodiment example and with reference to the accompanying drawings, where.

DETAILED DESCRIPTION OF THE INVENTION

Figure 1:
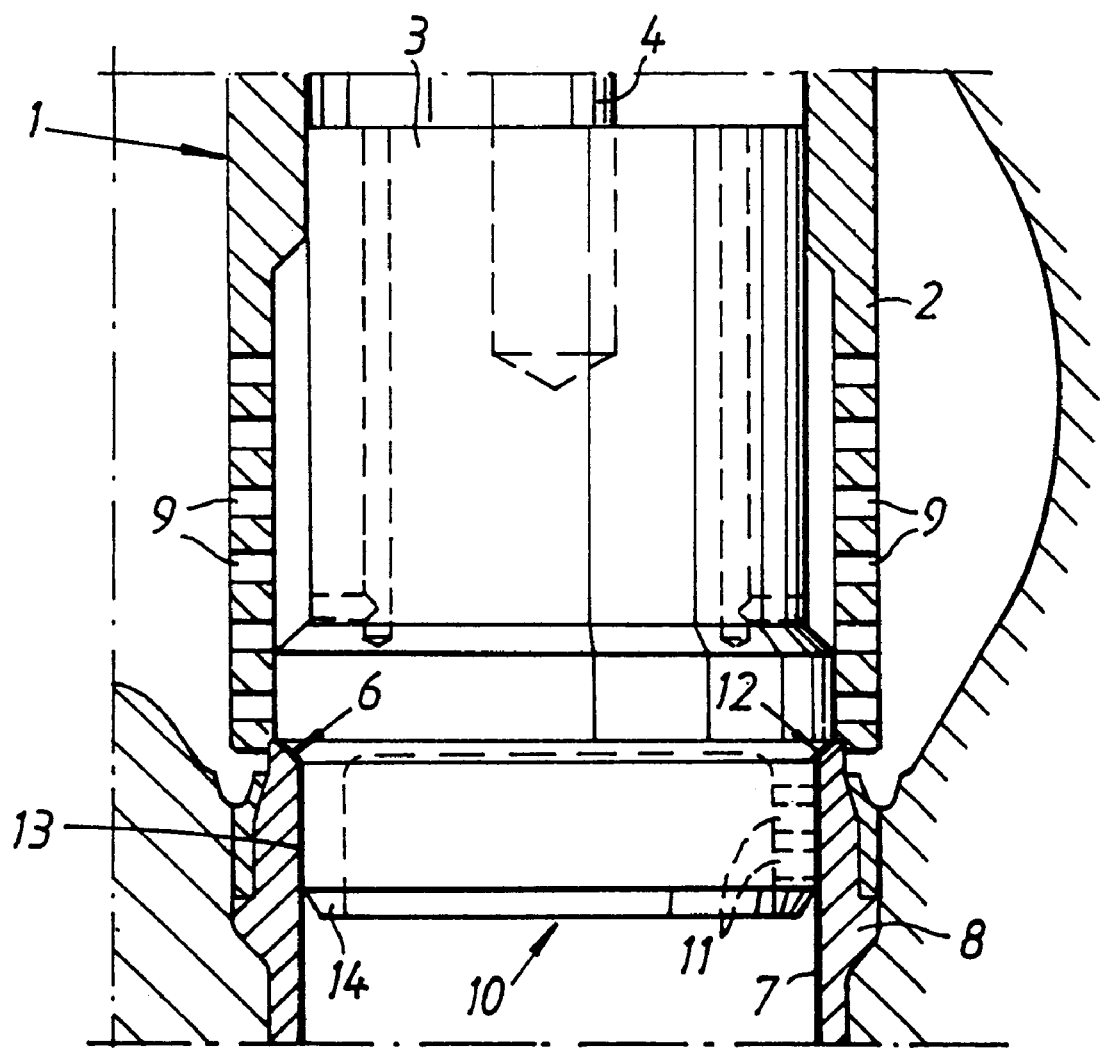
FIG. 1 is a schematic, vertical cross-section of a valve in accordance with the present invention.
Figure 2:
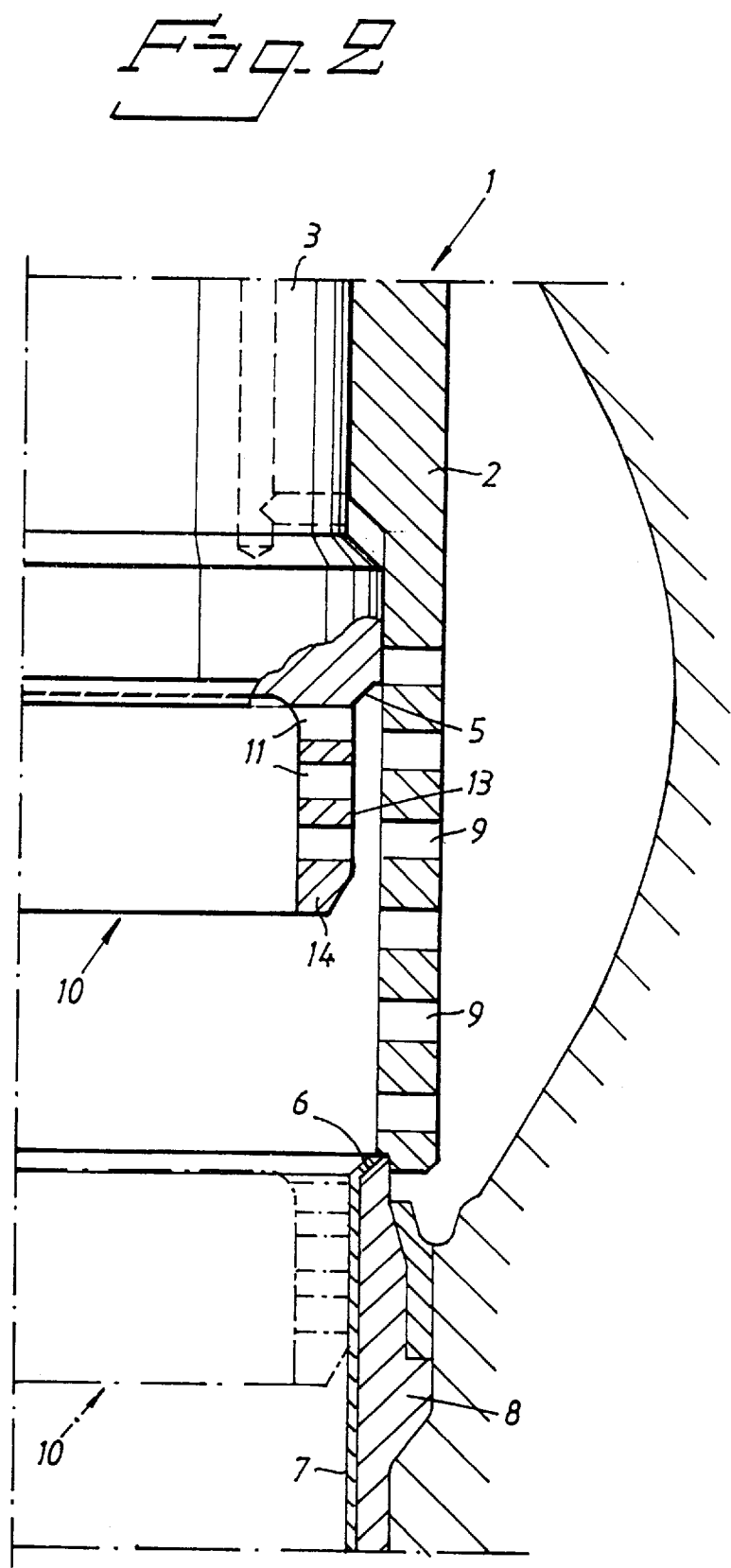
FIG. 2 is an enlargement of a portion of the cross-section in FIG. 1.

As will be seen from the drawings, the regulating valve in accordance with the preferred, inventive embodiment includes a cage 2 fixedly disposed in a valve housing 1 and accommodating a movable valve body 3. The latter is connected via a spindle 4 to an unillustrated linearly operating setting means for a positional regulator to set the position of the valve body 3 in the fixed cage 2. In the bottom position of the body 3, its sealing surface 5 engages against a seating 6 in the valve housing 1.

When the body 3 is gradually withdrawn upwards in the cage 2, orifices 9 in the cage are uncovered, consequently the valve's through-flow area increases. The body 3 has a short cage portion or skirt 10 coacting with the seating 6, this skirt having a plurality of either orifices or grooves 11. During the beginning of the valve opening phase, and as the body moves away from its sealing engagement against the seating 6, these orifices are successively uncovered, and when the body moves towards its sealing engagement against the seating they are successively closed off. An extra throttling location for small degrees of opening thus is provided. Great regulating accuracy, even for small flows is achieved in this way.

Figure 3:
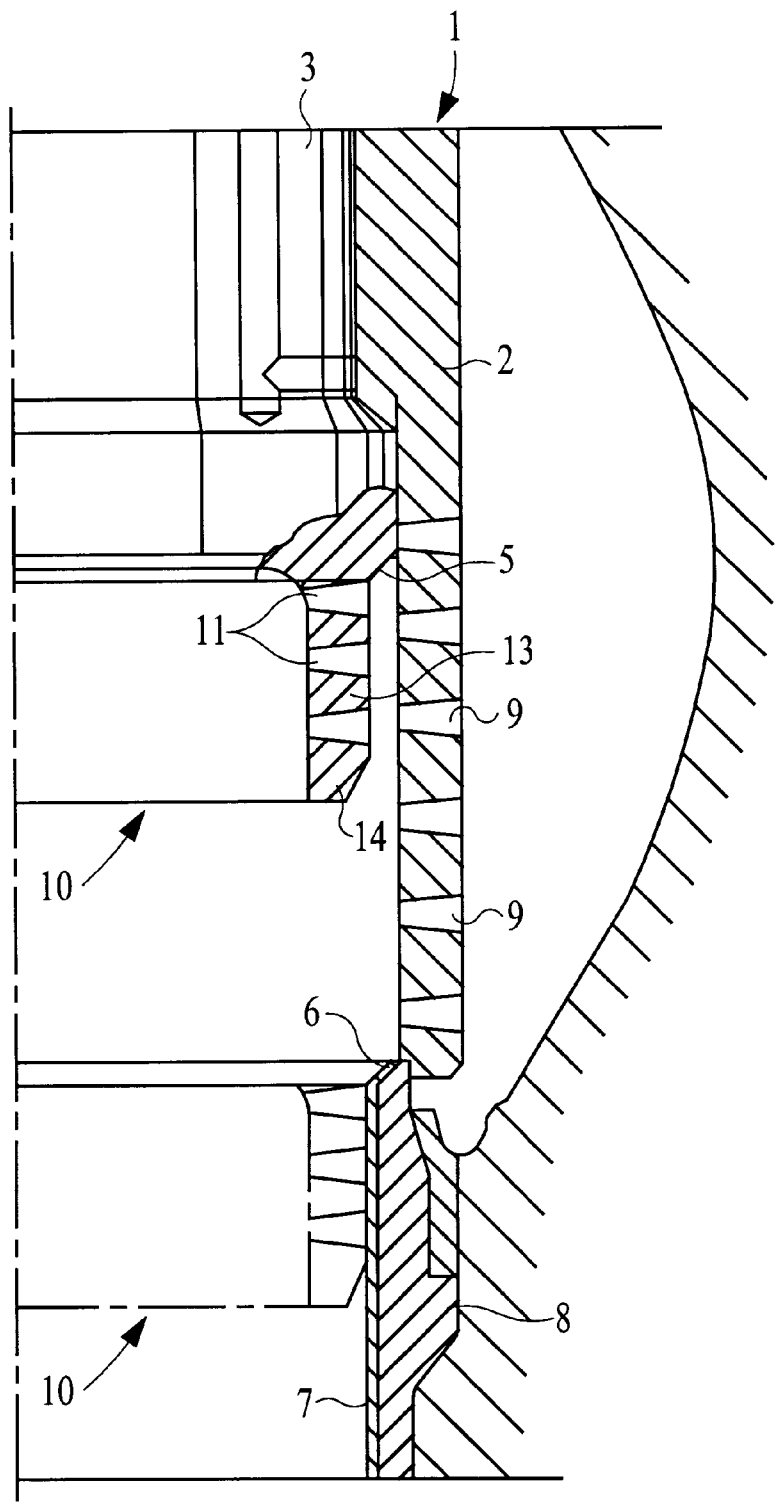
FIGS. 3 and 4 are modified enlargements of the cross-section in FIG. 1.
Figure 4:
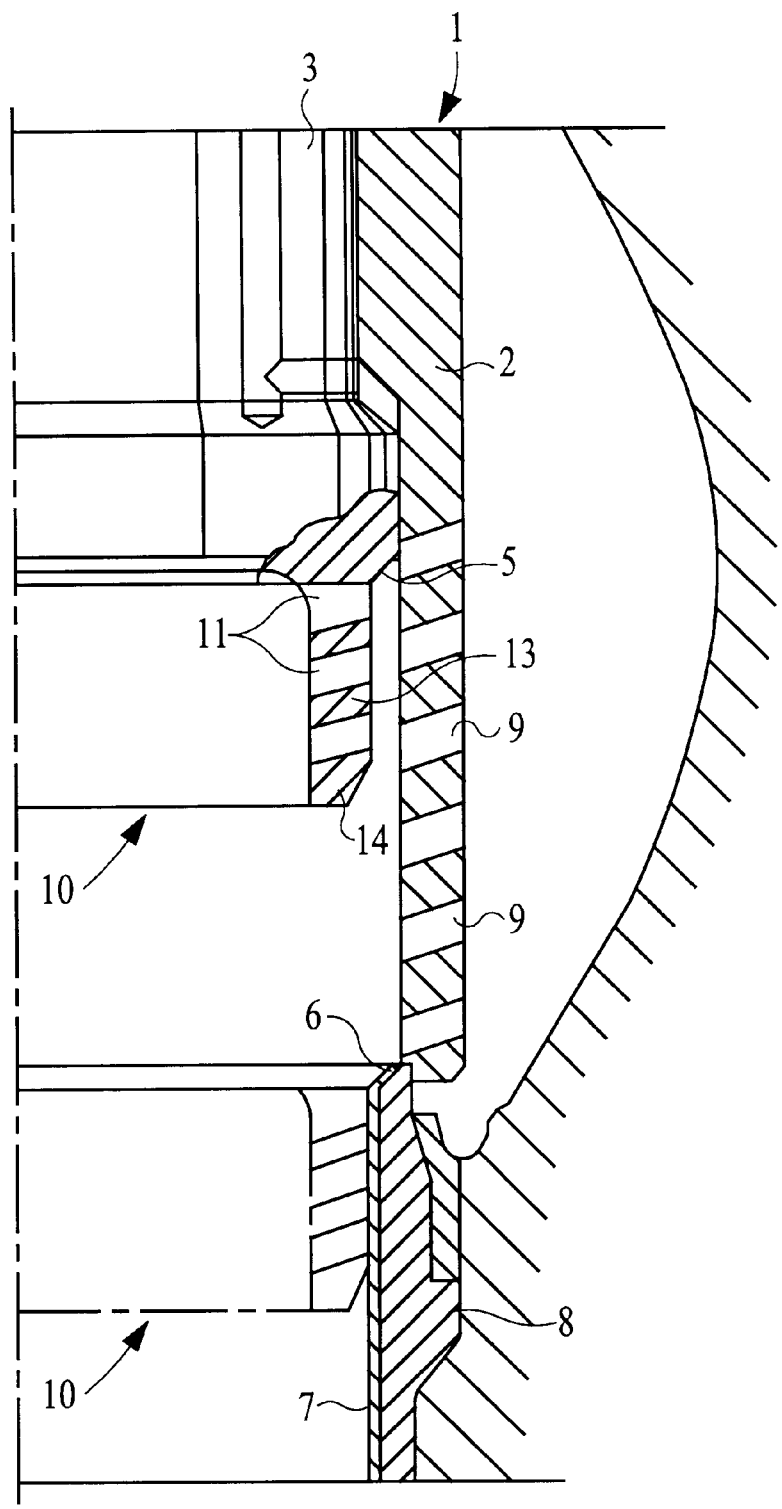

The skirt 10 formed on the valve body 3 extends as a continuation of the body length in its direction of movement, this extension being preferably 10–50% of the distance moved by the body in the bore of the cage 2 fixed in the valve housing 1. In a preferred embodiment, the length of the skirt 10 may be about 30% of the distance just mentioned. The skirt 10 is also concentrically reduced in diameter corresponding to the inner diameter of the seating 6. The seating sealing surface 12 may be implemented conically for coaction with the valve body sealing surface 5, which is also conical, the base of the imagined cone being upwards and its vertex downwards. Orifices 9 in the fixed cage 2 and orifices 11 in the skirt 10 may be implemented conically (FIG. 3) or inclined (FIG. 4) in relation to the valve body movement.

The sealing surface 12 on the valve housing seating 6, this surface coacting with the valve body sealing surface 5, continues downwards as a sealing surface 7 concentric with, and for coaction against, the cylindrical surface 13 of the skirt 10. The seating 6 and associated vertical sealing surface 7 comprise a separate unit, thermally flexibly attached in the valve housing 1, thus enabling a very small clearance to be maintained between skirt 10 and sealing surface 7. This results in gap leakage being practically negligible. Since the unit 8 is implemented as a flexible outer sleeve the seating 6 may expand, even though the valve housing 1 is heated more slowly than this seating. The short skirt 10 on the valve body 3 will be heated and expanded at the same rate as the seating 6, thus enabling the use of a small clearance. When the regulating valve is used normally, the valve body 3 is at a setting which permits a through flow of 20–100%, the pressure drop across the skirt 10 then being small, and it is not caused to contract, it thus being possible to maintain intended clearance for the entire operational life of the valve.

In the preferred embodiment, the lower edge portion 14 of the skirt 10 may be chamfered. The seating surfaces may also be provided with a hard coating, which will withstand high temperatures, making them stable against change in shape and giving them good properties for resistance to wear, against corrosion and for contraction.

Orifices 9 and 11 in, respectively, cage 2 and skirt 10, are disposed on the cylindrical surfaces so as to overlap, thus avoiding a so-called "stepping effect" in the area and flow characteristic. By selecting small orifices in the outer, fixed cage 2 a straining function is afforded, any large particles in the medium regulated by the valve being prevented from passing through it to cause wear and other damage to the sealing surfaces and other downstream components. In addition, flow capacity may be increased for large degrees of opening by providing a pressure regaining cone under the seating 6 and/or by withdrawing the valve body from the seating, so that the latter constitutes a restricting area also at full flow. The valve body preferably is shorter than its stroke, whereby the body is withdrawn completely from the seating. Accordingly the through-flow area increases with the material thickness in the skirt. This in turn results in capacity increase and consequently better utilization of valve body size.

We claim:

1. Arrangement in regulating valves for steam, gases or liquids, the arrangement comprising:

a valve housing;

a cage fixedly disposed in the valve housing, the cage having sidewalls with a length and orifices for fluid flow through the cage formed along the length of the sidewalls;

a seating disposed within the valve housing;

a valve body movably disposed within the cage so as to selectively and successively block fluid flow through the orifices in the sidewall of the cage as the valve body moves between an open position in which none of the orifices in the sidewall are blocked, and a closed position in which all of the orifices in the sidewall are blocked and the valve body seats against the seating;

a spindle cooperating with the valve body to position the valve body within the cage; and an annular skirt extending from the valve body and coacting with the seating, the skirt having a length and a plurality of orifices extending through the skirt and spaced along the length of the skirt for independent fluid flow therethrough, the plurality of orifices through the skirt being blocked by the seating in the closed position, the orifices through the skirt being arranged along the length of the skirt so as to be successively unblocked at the beginning of a valve opening phase, as the valve body moves away from the closed position toward the open position, so as to serve as an extra throttling location for small opening increments of the valve body.

2. Arrangement as claimed in claim 1, wherein the extension of the skirt on the valve body in the direction of movement or longitudinal extension of the valve body is 10–50% of the distance moved by the valve body in the bore of the cage fixedly disposed in the valve housing.

3. Arrangement as claimed in claim 2, wherein the extension of the skirt is 30% of the stroke of the valve body.

4. Arrangement as claimed in claim 1, wherein inwardly the skirt is concentrically positionally displaced in relation to the fixed cage by a distance corresponding to the radial extension of the seating.

5. Arrangement as claimed in claim 3, wherein the cage has sealing surfaces, wherein the sealing surface of the seating is conically formed for coaction with the sealing surfaces on the cage, which also has a conical extension with the vertex of the imagined cone downwardly directed and at the central axis of the valve body.

6. Arrangement as claimed in claim 1, wherein the orifices respectively in the fixed cage and the movable skirt are tapered or inclined in relation to the direction of movement of the valve body.

7. Arrangement as claimed in claim 1, wherein the skirt has an outer cylindrical surface of the skirt and the sealing surface of the seating in the valve housing merges into a vertical seating surface, the seating with its associated sealing surface constituting a separate unit thermally flexibly fastened to the inside of the valve housing, whereby very small clearance may be maintained between the skirt and the vertical sealing surface.

8. Arrangement as claimed in claim 1, wherein the skirt has a free edge portion that is chamfered.

9. Arrangement as claimed in claim 1, wherein the fixed cage and the skirt are cylindrical, and the orifices in respectively the fixed cage and skirt are disposed over the cylindrical surfaces so that the orifices of the fixed cage and the skirt, respectfully, mutually overlap.

10. The arrangement of claim 1, wherein the plurality of orifices through the skirt are arranged in annular rows, each row of orifices through the skirt being successively unblocked at the beginning of a valve opening phase.

11. The arrangement of claim 1, wherein the skirt has an inner surface and an outer surface, and the orifices through the skirt extend from the inner surface to the outer surface.

* * * * *